No. 607,967. Patented July 26, 1898.
C. O. SWICKARD.
TRACE FASTENER.
(Application filed Feb. 23, 1898.)
(No Model.)
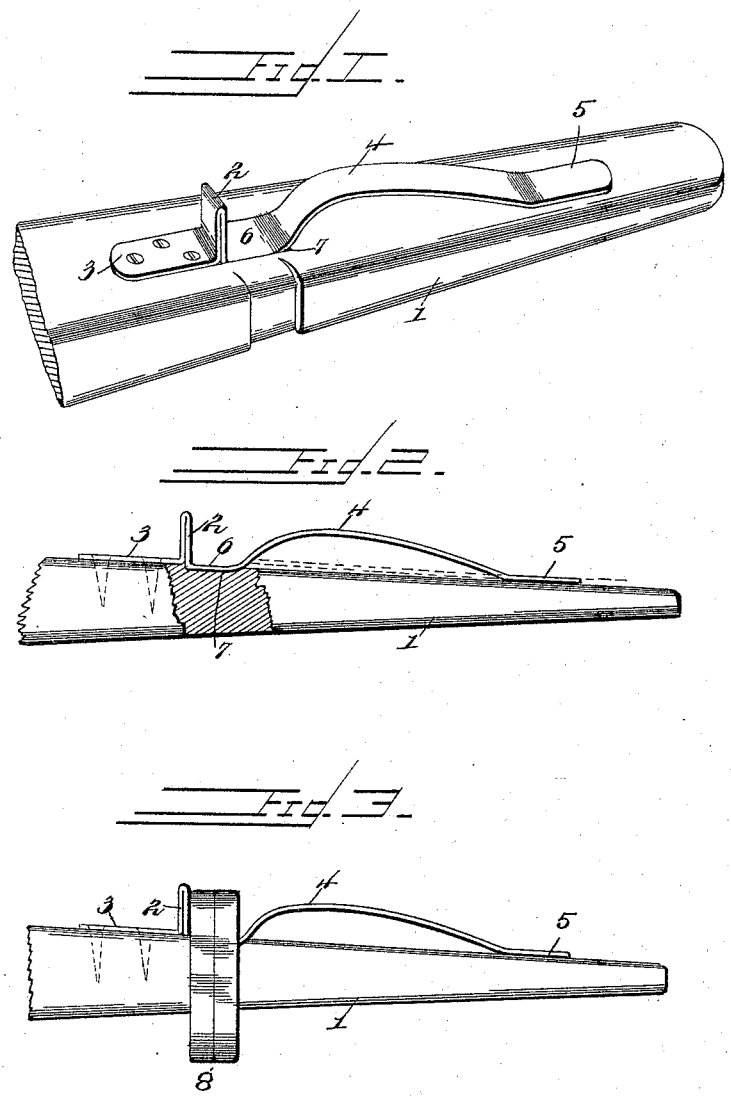
Witnesses
R. A. Shepard
V. B. Hillyard
Clarence O. Swickard Inventor
By his Attorneys,
C. A. Snow & Co.

UNITED STATES PATENT OFFICE.

CLARENCE O. SWICKARD, OF JANESVILLE, ILLINOIS.

TRACE-FASTENER.

SPECIFICATION forming part of Letters Patent No. 607,967, dated July 26, 1898.

Application filed February 23, 1898. Serial No. 671,314. (No model.)

*To all whom it may concern:*

Be it known that I, CLARENCE O. SWICKARD, a citizen of the United States, residing at Janesville, in the county of Cumberland and State of Illinois, have invented a new and useful Trace-Fastener, of which the following is a specification.

This invention aims to devise a fastener for securing a tug or trace to a single or whiffletree and prevent the slipping or creeping thereof upon the singletree when properly positioned.

In its construction the fastener comprises a strip of spring metal firmly attached at its inner end to the singletree and having its outer end free and adapted to move upon the singletree to admit of the middle portion, which is deflected outwardly, being compressed when forcing the eye of the tug or trace thereover. The spring-metal strip has an outwardly-extending stop at its inner end, formed by doubling the strip upon itself, and the portion between said stop and the outer end is deflected outwardly to prevent the outward movement of the eye end of the tug when engaged with the singletree. The portion of the fastener adjacent to the stop and between it and the outwardly-deflected part is in a lower plane than the shank portion of the fastener, so as to enter a depression or recess in the singletree and come about flush with the outer side thereof, thereby preventing injurious contact of the fastener with the eye of the tug.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of the end portion of a singletree, showing the application of the invention. Fig. 2 is a side elevation thereof, a portion of the singletree being broken away and the dotted lines showing the relation of the fastener when its deflected portion is depressed. Fig. 3 is a view similar to Fig. 2, showing the relation of the trace or tug when in position.

Corresponding and like parts are referred to in the following description and indicated in the views of the drawings by the same reference characters.

The singletree 1 is of the variety having its ends tapered, so as to readily pass through the eye of the trace or tug. The fastener is formed of a strip of spring metal of proper length and is secured at its inner end to an end portion of the singletree in any substantial manner by means of suitable fastenings. A stop 2 is provided at the inner end of the fastener by doubling a portion of the blank or strip upon itself, the parts of the strip upon opposite sides of the stop being bent to extend outwardly in opposite directions. The inner end 3 constitutes a shank which is apertured for the passage therethrough of the fastenings employed for attaching the device to the singletree. The outer end portion is curved or deflected away from the plane of the singletree, as shown at 4, and is intended to prevent outward displacement of the trace or tug when the latter is slipped into position. The outer terminal 5 of the fastener is flat and bears closely against the singletree and is adapted to ride thereon when the curved portion 4 is depressed to admit of the trace or tug passing thereover. The part 6, adjacent to the stop 2 and between it and the outwardly-curved portion 4, is in a plane lower than the plane of the shank 3 and enters a depression or recess formed in the singletree, whereby it comes about flush with the side of the singletree to which the fastener is applied.

By having the portion 6 of the fastener entering a recess or depression 7 of the singletree its corners cannot engage with the eye of the trace or tug and wear the same, which would be the case if the part 6 were in the same plane with the shank 3 and not countersunk, as illustrated.

The fastener may be of any length, and the blank or strip of spring metal may be of any width and thickness and formed of any metal best adapted for the purpose, steel being preferred because of its resiliency and comparative cheapness, strength, and lightness.

By having the part 6 adapted to enter the recess or depression 7 of the singletree it is possible to use a single fastening for connecting the device to the singletree, the device being prevented from turning by reason of the part 6 being cumbersome, as will be readily understood. When placing the tug or trace 8 in position or removing it from the singletree, the curved portion 4 of the fastener is depressed, as indicated by the dotted lines in Fig. 2, so as to admit of the eye of the tug or trace passing readily by the curved portion 4.

Having thus described the invention, what is claimed, and desired to be secured by Letters Patent, is—

1. A fastener for singletrees formed of a blank or strip of spring metal having an end portion doubled providing a stop and having the parts upon opposite sides of the stop extending outwardly therefrom in opposite directions, the one constituting a shank to receive the means whereby the fastener is secured to a singletree, and the other end portion curving outwardly away from the plane of the singletree and having its terminal free and bearing thereon, substantially as described.

2. In combination, a singletree, a fastener therefor consisting of a blank or strip of spring metal secured thereto at its inner end and having a portion doubled upon itself forming a stop, and having the opposite end portion curved outwardly, and its terminal made straight and bearing against the singletree, and having the portion intermediate of the stop and curved part in a plane lower than the shank and entering a recess or depression in the singletree, substantially as shown for the purpose described.

In testimony that I claim the foregoing as my own I have hereto affixed my signature in the presence of two witnesses.

CLARENCE O. SWICKARD.

Witnesses:
GEORGE A. SHAW,
JOHN L. ESKRIDGE.